Figure 1:
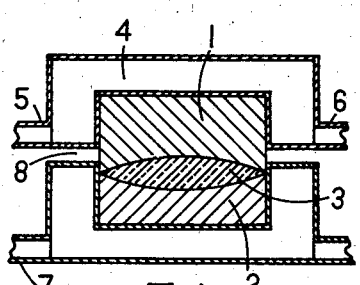

Aug. 11, 1942.   W. E. WILLIAMS   2,292,917
MOLDING OF PLASTIC AND OTHER MOLDABLE MATERIALS
Filed June 13, 1938

INVENTOR
WILLIAM E. WILLIAMS
BY *Norris & Bateman*
ATTORNEYS

Patented Aug. 11, 1942

2,292,917

UNITED STATES PATENT OFFICE 2,292,917

MOLDING OF PLASTIC AND OTHER MOLD-
ABLE MATERIALS

William Ewart Williams, Hampstead, London,
England

Application June 13, 1938, Serial No. 213,535
In Great Britain June 3, 1938

2 Claims. (Cl. 18—34)

This invention relates to the molding of articles of thermoplastic moldable materials by hot pressing between dies. The invention is mainly applicable to the molding of articles whose shapes are required to be predetermined with very great accuracy, such as is reckoned in wave lengths of light. Thus the invention is mainly directed to the molding of lenses and similar devices of an optical nature from what is commonly called "plastic glass" which may be a thermo-plastic synthetic resin whereof several forms of a suitable nature are known which can be molded substantially to the required optical shape by hot pressing at moderate temperature between highly polished dies which are usually formed of steel. Such manufacture forms the subject of British Letters Patent No. 416,398. An example of a transparent thermo-plastic synthetic resin which can be thus molded is methyl-methacrylate resin a form of which is known under the Registered Trade Mark "Perspex." In the specification of my application Serial No. 140,710, now U. S. Patent No. 2,206,797, there is described a particular method of compensating for the effects of unequal cooling of a wide aperture (plastic) lens in the dies after the actual hot pressing operation, whereby the required final shape of the lens may approach Rayleigh's tolerance limit for sensibly perfect performance. That method is also applicable to the production of aspheric lenses. The invention is not limited to the molding of so called plastics, but is applicable to the molding of glass and like thermo-plastic moldable material which is solid or substantially solid at ordinary temperatures.

In the present specification the term "lens" is intended to include flat discs or plates, prisms, graticules, diffraction gratings, plane and other mirrors, and other precision devices of an optical nature required to have optically accurate surfaces. The invention is not limited to optical devices but is applicable in general to the molding of any articles whose final shapes are required to be predetermined to a higher degree of accuracy than has heretofore been attainable with the known molding method other than that set forth in the specification of application Serial No. 140,710 aforesaid.

In the method heretofore employed for the molding of lenses and like articles which necessarily have distinct boundaries or peripheries and plane or curved faces, each of the two dies has had associated with it a pot-shaped jacket closely embracing the plane rear and the side faces of the die, so that by the circulation of a hot fluid and then a cool fluid through such jacket the heat is first transmitted to and then when the molding pressure has been applied is extracted from the plastic through the bodies of the dies and their molding surfaces, and to the cooling fluid in the jackets. By such arrangements, however, it is impossible to obtain with any very great accuracy molded articles of predetermined shape owing to the fact that the cooling must in general be more rapid at the periphery or boundary of the molded article and/or in the thinner portions thereof whilst furthermore, although the die surface may have the predetermined shape at room temperature it will not have that shape at the setting temperature of the plastic since at such time the temperature of the die surface cannot be uniform and they will assume a shape depending on the shape of the other surfaces of the die, the shape and volume of the jacket, and other things, as will be hereinafter further explained.

The present invention provides means and arrangements and methods whereby during at least the temperature range during which the plastic is setting there will be isothermals within the body of the dies, at least near the molding surfaces thereof, which isothermals shall be of such shape that the plastic will either set substantially simultaneously throughout its surface or at least will commence setting from the centre outward. To this end the shapes of the surfaces of the die which are not in contact with the material, and the shape of the heating and cooling jackets are so chosen that, in association in some cases of additional heat conducting bodies, the isothermal surfaces within the dies, at least near their molding surfaces, are caused to be substantially spherical or otherwise curved or plane, at least during the setting range, so that the molded article will have the exact predetermined shape. Such bodies may be constituted and disposed so as to retard the heat flow from regions where the cooling would otherwise be too rapid, and/or so as to accelerate the heat flow from regions whence the heat flow would be too slow. Said bodies are in general formed of materials and given shapes which vary in accordance with the shape and material of the dies and with the shapes and material of the plastic, as will hereinafter be further explained.

In general, the isothermal during cooling is made to coincide with the molding surfaces of the die, but when the article is, say, a convex lens of great axial thickness the isothermals in the die may be made to be spherically convex with respect to each lens surface so that there arises during the setting range an isothermal in the medial plane of the lens. In this latter case the die surface will not be in thermal equilibrium at the setting temperature range so that consequently the curvature impressed on the lens surface at the critical setting temperature will not be exactly that of the die when at room temperature (uniform temperature). For a given rate of cooling, which rate can be maintained for any particular case, the required actual shape of the die surface can be correspondingly assessed and changed by polishing by the method set forth in the specification of application Serial No. 140,710 aforesaid.

In the case, however, of convex lenses of such moldable materials which have very low thermal conductivity and/or where such lenses have considerable thickness in the centre it may be difficult to give the isothermal sufficiently small radius of curvature to produce an isothermal median plane in the lens. In such case a metal sleeve may be placed around the dies and shaped exteriorly so as to retain heat and thus maintain in the lens the desired median plane of uniform temperature.

To enable the invention to be more clearly understood it will now be described with reference to the accompanying drawing in which—

Figure 1 is a sectional elevation of a pair of dies with heating and cooling jackets, illustrating the prior art, whilst Figs. 2-6 inclusive are similar views of dies, jackets and additional bodies in accordance with the invention for molding five different forms respectively of lenses by way of example.

Referring first to Fig. 1 of the drawing, at 1 and 2 are shown the upper and lower dies between which an article 3, exemplified for purposes of explanation as a convex lens shaped body, is adapted to be molded. Surrounding the upper die 1 is a jacket 4 having inlet and outlet pipes 5 and 6 for the heating fluid such as steam and then the cooling fluid such as cold water. The lower die 2 is provided with a similar jacket 7.

When using the method and arrangement illustrated by Fig. 1 it will be appreciated that after the plastic 3 has been heated and pressed, when the cooling process is taking place several important defects will arise which are impermissible for optical purposes.

On the one hand the die surface which may for example be truly spherical when at a uniform temperature, such as room temperature, will not be spherical at the setting temperature of the plastic since at such temperature the optical surfaces of the die will not be in thermal equilibrium, that is to say, every part of the die surfaces will not be at the same temperature, and consequently the die surfaces will have shapes dependent on the shape or contour of the non-optical parts of the dies and upon the shape and volume of the heating and cooling jackets. Thus, owing to the fact that the outer face of the die is plane whilst the molding face is spherical and to the fact that the pot-shaped jacket 4 or 7 has a portion surrounding the periphery of the die 1 or 2, the isothermal in the die, at least near its molding surface, will become frusto-conical and thus the molding surface of the die will assume a corresponding non-spherical shape at all times and temperatures during which the dies and the material are cooling.

On the other hand the peripheral portions of the lens 3 must obviously cool and become set solid before the central portion of the lens so that in consequence of the inevitable shrinkage of the plastic on setting the central portion of the lens will set under tension. Whilst this is of no importance in ordinary articles, it is substantially impermissible from the point of view of optical precision owing to the double refraction which is produced by the strain.

Furthermore, it will be appreciated that there is essentially a gap 8 between the peripheral parts of the jackets 4 and 7. The presence of this gap intensifies the non-uniformity of the cooling of the plastic lens 3 as will hereinafter appear, this being mainly a peripheral effect.

Figure 2:
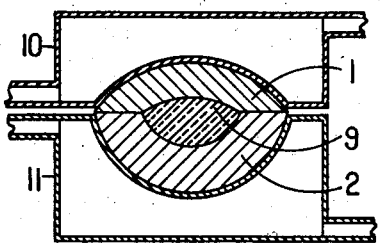

Referring now to Fig. 2 which illustrates an arrangement in accordance with the present invention, let it be assumed that it is desired to mold a lens 9 of the bull's-eye type having faces of different radii of curvature. In this case the dies 1 and 2 have spherical outer faces having the same centres of curvature as the respective molding faces so that radially the dies are of uniform thickness. In this case the outer faces of the dies 1 and 2 are in contact with jackets 10 and 11 whose inner faces thus necessarily have curvatures the same as the respective outer faces of the dies. It will thus be appreciated that the isothermals in the dies at or at least near the molding faces thereof have curvatures which coincide with or have the same centre of curvature as the molding faces of the dies. Thus at substantially any temperature the whole surface of the lens 9 should be at uniform temperature. However, it will be obvious that the periphery of the lens 9 will tend to cool at a greater rate than the inner zones of the lens so that one of the defects hereinbefore mentioned is not avoided, namely, the lens will set under tension in the central regions. Furthermore it will be appreciated that since in the arrangement shown in Fig. 2 the jackets must have curved surfaces, it would be necessary to have a different jacket for every different lens to be molded. Obviously it is generally more convenient to have jackets with flat faces since these, within limits can then be used for molding a great variety of lenses or other articles. Further in the preferred methods and arrangements according to the invention jackets having flat faces are used and there are associated with the dies the guard rings and in some cases the further heat conducting bodies as will hereinafter be described with reference to the remaining figures of the accompanying drawing.

Figure 3:
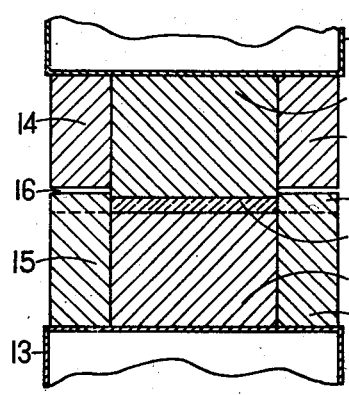

Referring next to Fig. 3, this illustrates the molding of a disc or window 12 having plane parallel faces. In accordance with the preferred method the dies 1 and 2 have plane outer faces fitting against the plane faces of the jackets 13. The dies 1 and 2 are surrounded by respective guard rings 14 and 15 which are made of a material such as steel, having substantially the same thermal conductivity and specific heat as the material from which the dies are formed. The cooling jackets 13 are in contact with the outer faces only of the dies and of the guard rings 14 and 15. The latter receive heat laterally from the dies 1 and 2, and from the mass of plastic 12, the heat flows in the axial direction outwards along the dies and guard rings to the jackets 13 during the cooling operation. It will be appreciated therefore that since the cooling jackets around the sides of the dies in Fig. 2 are replaced by the guard rings 14 and 15 in the arrangement shown in Fig. 3 the cooling is substantially uniform over the whole surface of the plastic, the rate of cooling at the periphery of the disc 12 being relatively reduced. These guard rings may thus be compared, as to their effect, with the guard rings of a Kelvin condenser or electrometer. Although the guard rings 14 and 15 tend to produce substantial uniformity of cooling (or heating) over the whole of each surface of the plastic disc or window 12 as aforesaid, and the isothermals at the molding surfaces are nearly plane, there are further effects due to the gap 16 between the guard ring and to the low specific heat of the plastic 12, namely, the isothermals in the dies tend, more particularly near the periphery, to become concave towards the die surfaces. Therefore, according to a subsidiary feature of the present invention, the axial length of the gap 16 between the guard rings 14 and 15 is made small in relation to the thickness of the disc 12 so that the isothermal surfaces during the cooling process are substantially plane, since the small gap 16 may be said to have a heat equivalent equal to the difference of the heat equivalents of the plastic 12 and the parts of the steel guard ring corresponding to it. Alternatively the gap 16 may be made as small as is permissible and an auxiliary guard ring 15a provided of a material which has a specific heat and thermal conductivity the same as or comparable with that of the plastic 12. Thus, the members 15 and 15a constitute a composite guard ring giving in this instance a plane isothermal over a far wider temperature range and rate of cooling than is possible with the guard ring 15 alone.

Preferably the guard rings 14 and 15 are surrounded by a sleeve of heat insulating material which has low thermal capacity, in order to reduce lateral radiation from the guard rings. Such a sleeve is shown at 17 in Fig. 4 and will be hereinafter described.

When jacketed dies similar to those indicated by Fig. 1 were actually used to mold a plastic glass spherical meniscus lens which was 2 inches in diameter and intended to have +1D power, it it was found that the resultant lens had a power which was less by about 10% than was intended, whilst the actual axial height of such lens had become reduced by about ½ mm., and, moreover, the surfaces were not spherical. This result was attributed mainly to the fact that since the periphery of the plastic set first and the central portion set last, the central portion set under such tension that owing to the natural elasticity of the material its curvature had collapsed.

Since the present invention is applicable in the molding of articles having one or more plane surfaces, it is to be understood that, in the interests of succinctness, the word "curvature" is intended within the scope of the appended claims to include curvatures of infinite radius.

Figure 4:
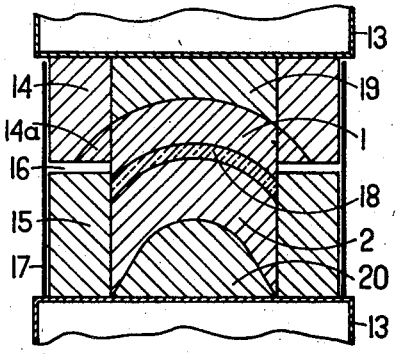

The arrangement shown in Fig. 4 according to the present invention is for the molding of a meniscus plate or lens 18. The dies 1 and 2 in this case, according to the invention, are given outer faces which are respectively convex and concave so that the dies are approximately of uniform thickness, whilst bodies 19 and 20 are disposed between the dies 1 and 2 respectively and the flat faces of the jackets 13. These bodies 19 and 20 are formed of a material, such as copper, of thermal conductivity considerably higher than that of the material of the dies. The upper guard ring 14 is in this case formed of the same material as the body 19 and includes an annulus 14a which on the one hand is made of a material such as steel having substantially the same specific heat as that of the die 1 and on the other hand has an upper spherical surface of radius equal to that of the outer surface of the die 1 and at the same centre of curvature. By such means the isothermal during cooling can be made to coincide fairly accurately with the optical surfaces of the dies so that when cooled down, through setting temperature, to room temperature, the meniscus plate 18 will be spherical and free from strain. With regard to the actual shape of the bodies 19 and 20 it may be helpful here to state that if they were formed of a material of infinite conductivity, their surfaces adjacent the dies should be concentric with the optical surfaces of the dies. In practice copper or copper silicon alloy is used and allowance has to be made for the relative thermal conductivities of the dies and bodies; and for any given rate of cooling, to a relatively small extent for the specific heats of the dies and bodies, such that the isothermal surfaces coincide with the optical surfaces of the dies.

The sleeve 17 may consist of asbestos paper and may be separated from the guard rings by an air gap.

Figure 5:
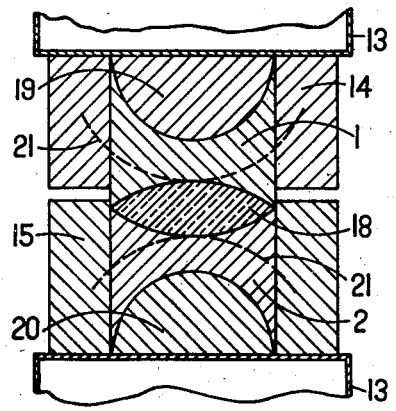

In Fig. 5 is shown a preferred arrangement according to the invention for molding a convex lens and in this case the dies 1 and 2 are surrounded by the guard rings 14 and 15 of steel and have between their concave outer faces and the plane faces of the jackets 13, bodies 19 and 20 of copper which are both convex on those of their faces which are in contact with the concave outer faces of the dies 1 and 2, the arrangement being such that in order to extract more heat from the centre portion of the convex lens, the isothermal instead of coinciding with the optical die surface, is convex towards the lens surface as indicated by the dotted lines 21. This results in an isothermal in the median plane of the lens 18. The actual die surfaces will not in this case be in thermal equilibrium at the setting temperature of the plastic so that consequently the curvature impressed on the lens at the setting period will not be exactly that of the die when the latter is at uniform temperature. This departure can be compensated for, as hereinbefore stated, by the method described in the specification of application Serial No. 140,710.

Figure 6:
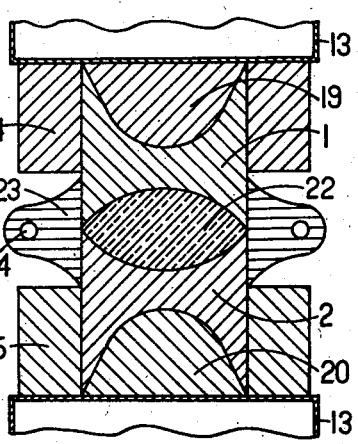

Referring next to Fig. 6 of the accompanying drawing, the convex lens 22 which is to be molded between the dies 1 and 2 is supposed to be so thick in the central region that owing to the poor conductivity of the plastic it is not possible by the means described with reference to Fig. 5 to make the isothermals sufficiently convex to obtain the median isothermal plane in the lens. In this case the copper bodies such as 19 and 20 are retained but the guard rings 14 and 15 are made shorter in axial length and a metal sleeve ring 23 such as of copper is provided which has such external configuration and volume that the desired median plane of uniform temperature is obtained in the lens 22, since the sleeve ring 23 tends to retain the heat at the peripheral part of the lens during the cooling down. Preferably the sleeve ring 23 is encased in asbestos paper. There may be provided as shown at 24 a passage in the sleeve ring 23 for the accommodation of an electric or other heater or for the flow of a heating fluid the temperature of which may be adjusted or even varied during the cooling down and it will be appreciated that when such heating is provided the external shape of the sleeve ring may require to be different.

As a final example an arrangement for molding a plano-convex lens may comprise an upper die 1, jacket 13 and guard ring 14 as illustrated in Fig. 3 and as described with reference thereto, and a lower die having a convex molding face and a concave outer face, this lower die being surrounded by a guard ring 15, preferably a composite guard ring 15, 15a, as described with reference to Fig. 3. The lower jacket in this case has a convex portion in contact with the concave outer face of the lower die or alternatively a lower die 2, body 20, guard ring 15 and plane lower jacket 13 may be employed as illustrated in Fig. 4.

If it is desired to produce a lens which is aspheric such as in accordance with one of the features of application Serial No. 140,710 aforesaid, the die surface may be made initially aspheric by the method described in said application. Then in most cases the amount of the asphericity is so small that there is no need to introduce the same asphericity into the isothermals.

I claim:

1. Apparatus for molding two convex surfaces on thermo-plastic material, comprising jackets having plane inwardly directed faces for the circulation of heating and cooling fluids, two cooperating dies each having inner and outer concave faces, the inner faces of said dies constituting molding surfaces, bodies of thermal conductivity appreciably higher than that of the dies and each of plano-convex form, the convex faces of said bodies forming their inner faces which are in contact with the outer concave faces of the respective dies and the plane outer faces of said bodies being in contact with the respective plane inwardly directed faces of the jackets, and guard rings surrounding said dies, said guard rings having thermal characteristics similar to those of the dies whereby the cooling isothermals will be convex to the molding surfaces of the dies.

2. Apparatus for molding thermo-plastic material into a doubly convex form which is axially thick in its central region, comprising jackets having plane inwardly directed faces for the circulation of heating and cooling fluids, two cooperating dies each having two concave faces and having in contact with their outer faces respectively bodies of thermal conductivity appreciably higher than that of the dies and each of plano-convex form, the plane outer faces of said bodies being in contact with the respective plane inwardly directed faces of the jackets, and each die being surrounded by a guard ring having thermal characteristics similar to those of the dies whereby the cooling isothermals will be convex of the molding surfaces of the dies, and a sleeve located between said guard rings surrounding the thermo-plastic material and in contact with the dies whereby a median plane of uniform temperature can be obtained in the thermo-plastic material during cooling.

WILLIAM EWART WILLIAMS.